United States Patent
Chen et al.

(10) Patent No.: US 8,422,559 B2
(45) Date of Patent: Apr. 16, 2013

(54) MATCHING-PIXEL SUB-SAMPLING MOTION ESTIMATION METHOD FOR VIDEO COMPRESSION

(75) Inventors: To-Wei Chen, Taoyuan County (TW); Yu-Wen Huang, Taipei (TW); Chih-Hui Kuo, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1336 days.

(21) Appl. No.: 11/870,417

(22) Filed: Oct. 10, 2007

(65) Prior Publication Data

US 2009/0097564 A1 Apr. 16, 2009

(51) Int. Cl.
*H04N 7/12* (2006.01)
*H04N 11/02* (2006.01)
*H04N 11/04* (2006.01)

(52) U.S. Cl.
USPC ............ 375/240.17; 375/240.12; 375/240.16; 348/699; 348/700

(58) Field of Classification Search ............. 375/240.17, 375/240.12, 240.16; 348/699, 700; 345/611
See application file for complete search history.

(56) References Cited

U.S. PATENT DOCUMENTS

| 5,189,526 A | * | 2/1993 | Sasson .......................... 382/246 |
| 2002/0140706 A1 | * | 10/2002 | Peterson et al. .............. 345/611 |
| 2003/0123550 A1 | | 7/2003 | Wang |
| 2006/0061592 A1 | * | 3/2006 | Akenine-Moller et al. .. 345/611 |
| 2008/0170617 A1 | * | 7/2008 | Han et al. .................. 375/240.16 |

* cited by examiner

*Primary Examiner* — Huy D Vu
*Assistant Examiner* — Omer Mian
(74) *Attorney, Agent, or Firm* — Winston Hsu; Scott Margo

(57) ABSTRACT

Sub-sampling pattern design for motion estimation in video compression. A motion estimation method divides a first frame into a plurality of macroblocks, performs block matching for a current macroblock pair on a candidate macroblock pair of a second frame. The current macroblock pair and the candidate macroblock pair are sampled according to a sub-sampling pattern, and an error measure between the current and candidate macroblock pairs is calculated. The sub-sampling pattern is constructed by a plurality of repeating units, and each repeating unit is composed of a first and a second pattern unit.

8 Claims, 6 Drawing Sheets

MATCHING-PIXEL SUB-SAMPLING MOTION ESTIMATION METHOD FOR VIDEO COMPRESSION

BACKGROUND OF THE INVENTION

1. Field of the Invention

The present invention relates to motion estimation, and more particularly, to motion estimation implementing matching-pixels sub-sampling technique in video compression.

2. Description of the Related Art

Motion Estimation (ME) is a technique commonly used in video compression to reduce temporal redundancy between video frames. By replacing similarly repeating video segments with motion vectors, memory requirements for encoding video files are accordingly reduced. This allows for a size reduction of large video files, while in most cases not drastically sacrificing or degrading video quality.

FIG. 1 is an illustration describing frame motion estimation (frame ME) according to the prior art. As previously stated, the goal of motion estimation is to reduce temporal redundancy between video frames, which includes a current frame 120 and a reference frame 110. The current frame 120 is divided into macroblocks (MBs) to be used as video segments for comparison with various candidate MBs in the reference frame 110. The size of the MBs can vary according to the desired tradeoff in computational efficiency and accuracy, but are typically around 16×16 pixels in many algorithms. Once divided, every macroblock (MB) in the current frame 120 is compared to MBs in the reference frame 110 using a predetermined error measure to determine a best matching candidate MB. A vector denoting the matching MBs between frames (also called a motion vector) is then denoted, and used to replace the current MB in the current frame 120 in the compression algorithm. Using the illustration in FIG. 1, the baseball macroblock 125 in the current frame 120 can be reasonably matched to the baseball macroblock 115 in the reference frame 110. The motion vector 130 illustrates the displacement between the matching macroblocks in the reference frame 110 to the current frame 120.

Because storing motion vectors require less memory than storing actual macroblock data, memory consumption can be drastically reduced when ME is used in a compression algorithm. During reconstruction, macroblocks in the reference frame indicated by motion vectors are used to predict the current frame. This technique is known as motion compensated prediction or motion compensation. During motion compensation, the matching macroblock in the reference frame that is referenced to by the motion vector, is copied into the reconstructed frame. Continuing with the example shown in FIG. 1, in motion compensation, baseball macroblock 125, which has been omitted from storage, is replaced in the current frame 120 with baseball macroblock 115 of the reference frame 110 according to motion vector 130.

The resulting video quality from compressed video using motion estimation can vary according to the algorithm used to find motion vectors. An inaccurate motion vector leads to a dissimilar prediction which in turn results to poor video quality. An error measure is used in order to quantify the degree of similarity between macroblocks during block matching for motion estimation. The sum of absolute differences (SAD) and the sum of squared error (SSE) are some of the commonly used error measures applied to block matching.

While the above frame motion estimation technique is usually applied to progressive video sources, where full frames of video images are continuously shown, the ME operation can also be applied to interlaced video. FIG. 2 illustrates the composition of an interlaced video frame 200 according to the prior art. In interlaced video, an interlaced frame 200 comprises an even field 210 (consisting of the even horizontal lines), and an odd field 220 (comprising the odd horizontal lines). When performing motion estimation for interlaced video however, instead of comparing entire macroblocks, one field of a macroblock in a current frame is compared to a field of a macroblock in a reference frame. This is alternatively known as field motion estimation (field ME). Both frame ME and field ME can however be applied to interlaced video with varying results. As it turns out, when the video is static having limited motion in this video sequence, frame ME produces better results. However, when the video is more dynamic with greater motion in the video sequence, field ME produces better matching results. As field ME and interlaced video is well known to those skilled in the art, further discussion is omitted for brevity.

When determining matching macroblocks, the matching pixels may be sampled to reduce computational complexity. Certain pixels of both current MB and candidate MB are selected to compute a characterizing value (usually an SAD value or MSE), and the characterizing values of the candidate MBs are compared. FIG. 3 illustrates an example where ME is done by matching two macroblock pairs of 32*16 pixels, and a four-queen sub-sampling pattern 310 is used. FIG. 3 illustrates an example to sample a 16*32 macroblock pair. In this case, both current MB pair and candidate MB pair are of 16*32 pixels. A four-queen pattern 340 selecting 4 pixels out of every 4*4 block is used repeatedly to form a 16*32 sub-sampling pattern 310. The sub-sampling pattern 310 is applied to both current and candidate MB pairs. Only those pixels selected are included in the calculation of error measures.

Although the four-queen sub-sampling pattern for frame ME appears evenly distributed, when applied to field ME, the sub-sampling patterns 320 and 330 became uneven. The lack of a uniform sampling distribution for field ME may therefore provide under-optimized matching results, which reduces the quality of compressed video.

SUMMARY OF THE INVENTION

One objective of the claimed invention is therefore to provide a motion estimation method utilizing matching-pixel sub-sampling, to solve the above-mentioned problem. The sub-sampling pattern can be applied to both progressive and interlaced video sources, while resulting in more uniform sampling distributions for both frame and field ME.

According to an exemplary embodiment of the claimed invention, a method of motion estimation with matching-pixel sub-sampling in video compression is disclosed. The method first divides a first frame into a plurality of macroblocks, performs block matching for a current macroblock pair on a candidate macroblock pair of a second frame. The current macroblock pair and the candidate macroblock pair are sampled according to a sub-sampling pattern for calculating an error measure between the current and candidate macroblock pairs. The sub-sampling pattern is constructed by a plurality of repeating units, and each repeating unit is composed of a first and a second pattern unit.

These and other objectives of the claimed invention will no doubt become obvious to those of ordinary skill in the art after reading the following detailed description of the preferred embodiment that is illustrated in the various figures and drawings.

DETAILED DESCRIPTION

As described in the prior art, both frame ME and field ME can be applied to interlaced video, with the preferred selection depending on the relative translational motion of the video. However, during interlaced video processing, it is difficult to determine whether the video should be encoded with frame ME or field ME. In this case, both frame and field ME have to be performed, and the method producing the better computational results (usually in terms of SAD calculation or other error measure calculation methods for quantifying dissimilarity between macroblocks of current and reference frames) is chosen. A sub-sampling pattern is therefore required to provide a uniform sub-sampling distribution for both frame ME and field ME in performing error measurement calculations, in order to enhance the rate-distortion (R-D) performance. The sample points used in the sub-sampling pattern are typically being re-used for both frame ME and field ME to reduce the computational complexity. The proposed sub-sampling pattern of the present invention therefore provides good coding results for both frame and field ME, and the sub-sampling pattern can be generated by a simple algorithm. The proposed method detailed below can be performed by a standard video coding apparatus. The operation of the video coding apparatus for performing the disclosed method should be obvious to one skilled in the art after reading the proposed embodiments of the invention.

The present invention sub-sampling pattern comprises a plurality of repeating units, and each repeating unit incorporates at least two different pattern units. The two pattern units can be different patterns entirely, or comprise one pattern unit that is inverted, reflected, left or right shifted, up or down shifted, or rotated of the other pattern unit. In other words, a second pattern unit can be derived from a first pattern unit by inverted, reflected, shifted, rotated, or any combination of the above transformations. In some embodiments, the size of the pattern units is N*N pixels, and the size of a repeating unit is N*2N pixels. By providing a sub-sampling pattern based on different pattern units, a uniform overall sampling distribution can be obtained for both frame ME and field ME processing on interlaced video. This will be elaborated in further detail below.

Figure 1:
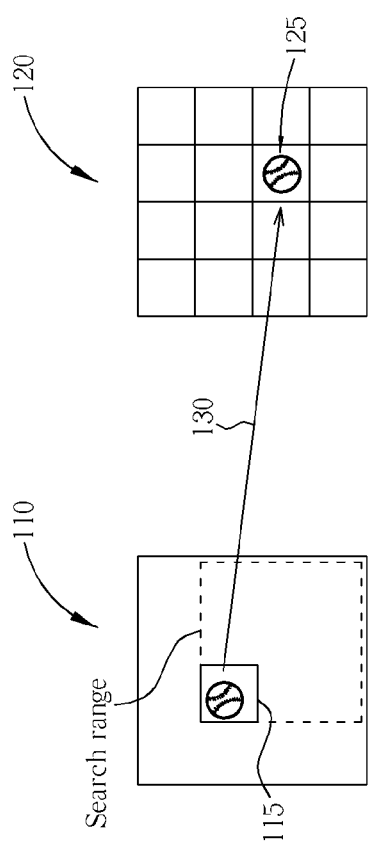
FIG. 1 is an illustration describing motion estimation (ME) according to the prior art.
Figure 2:
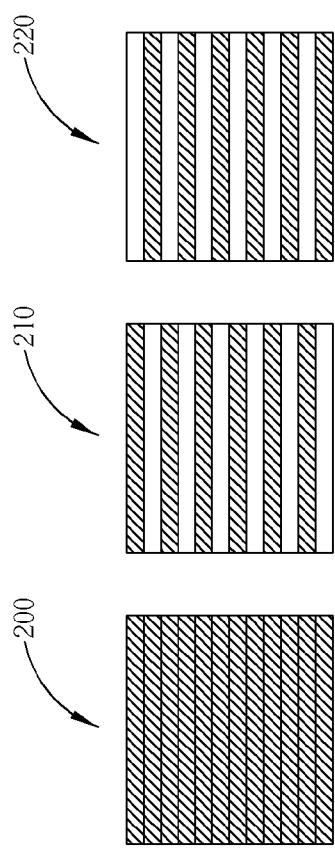
FIG. 2 illustrates the composition of an interlaced video frame 200 according to the prior art.
Figure 3:
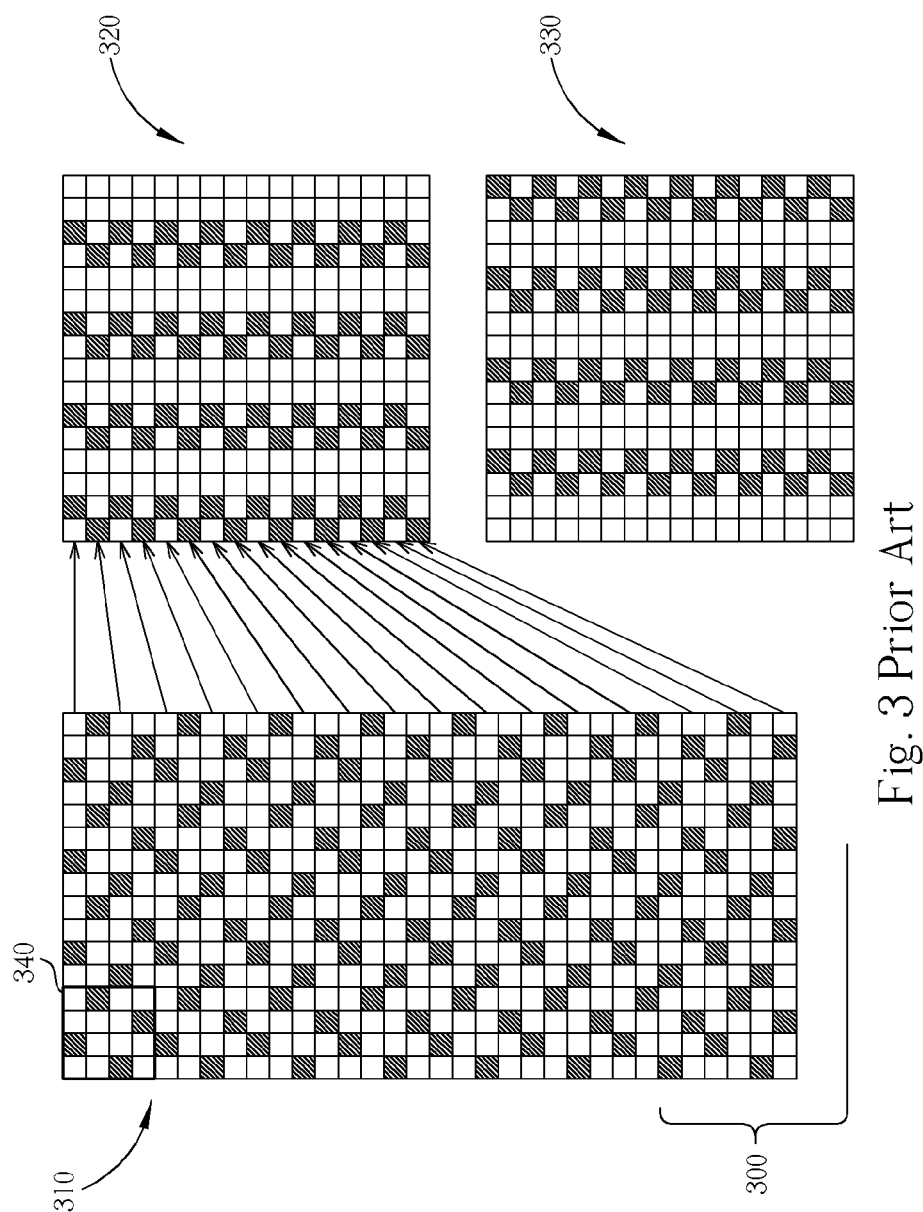
FIG. 3 illustrates the frame sub-sampling pattern and interlaced field sampling patterns when a four-queen sampling pattern is applied for motion estimation.
Figure 4:
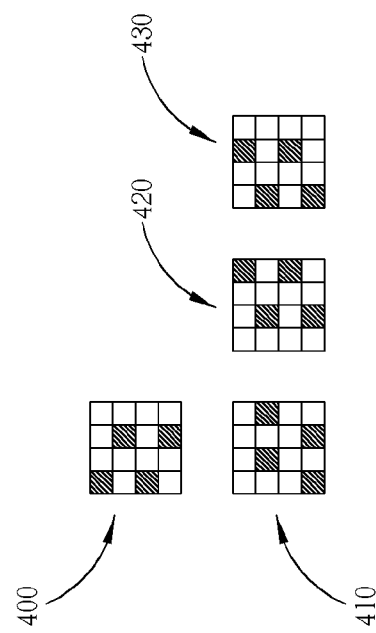
FIG. 4 is a diagram illustrating examples of the derived sub-sampling patterns according to an embodiment of the present invention.

FIG. 4 is a diagram describing construction of the sub-sampling pattern according to some embodiments of the present invention. A sub-sampling pattern used to sample pixels of current and candidate macroblock pairs is constructed from a plurality repeating units, for example, a 16*32-pixel macroblock pair is sampled by a four-queen pattern 310 as shown in FIG. 3, where the repeating unit of the four-queen pattern 310 is a 4*4-pixel pattern unit. Embodiments of the present invention combine two or more 4*4-pixel pattern units to form a repeating unit for the sub-sampling pattern. In the example shown in FIG. 4, a 4*4-pixel pattern unit 400 is chosen as a first pattern unit to be combined with a second pattern unit chosen from 410, 420, or 430 to form a 4*8-pixel repeating unit. The second pattern unit must be different from the first pattern unit, but it could be derived from the first pattern unit. For example, the pattern unit 410 is derived by rotating the first pattern unit 400 anticlockwise by 90 degrees, the pattern unit 420 is derived from the first pattern unit 400 by mirroring on a vertical axis, and the pattern unit 430 is derived from the first pattern unit 400 by mirroring on a horizontal axis. Once the second pattern unit is chosen, the two chosen pattern units form a 4*8-pixel repeating unit for the sub-sampling pattern. The sub-sampling pattern is constructed by 16 4*8-pixel repeating units, and is used to properly sample a current macroblock pair of the first frame and a candidate macroblock pair of the second frame when conducting motion estimation.

Figure 5:
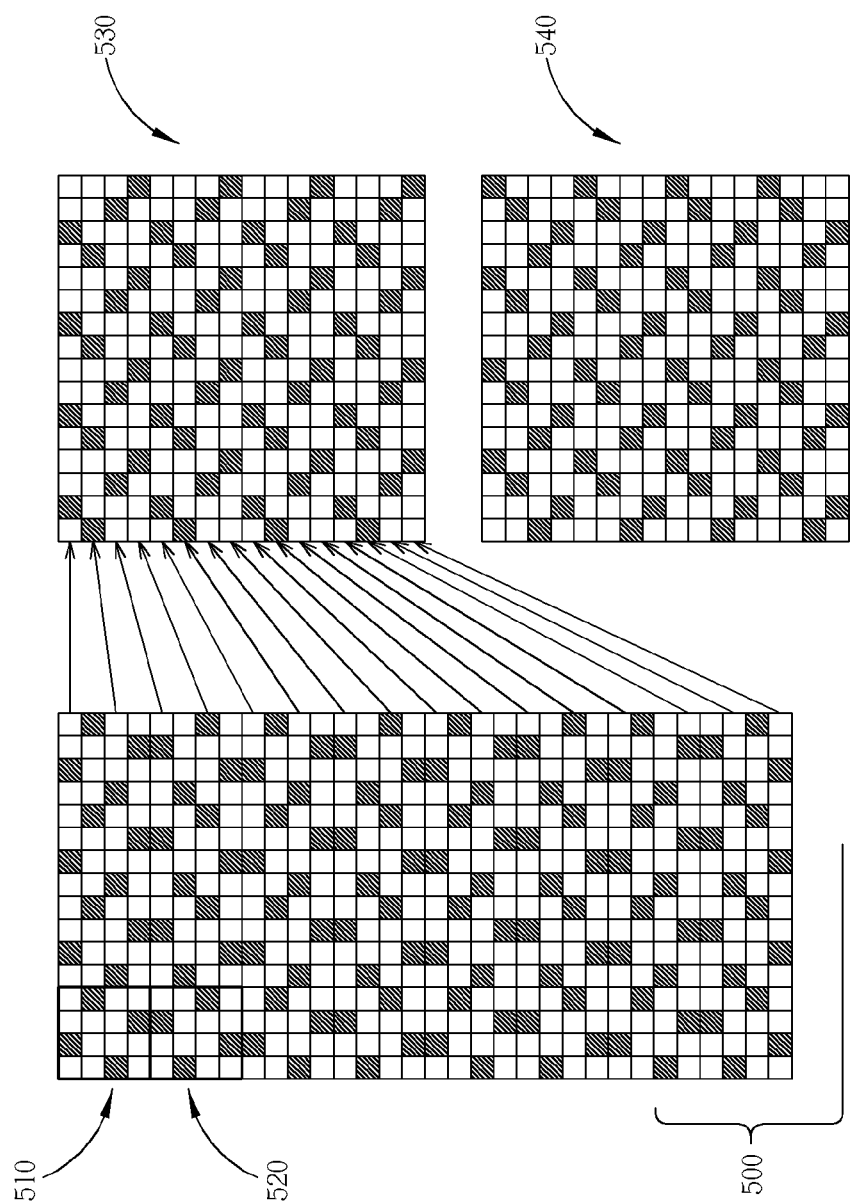
FIG. 5 is a diagram describing construction of the sub-sampling pattern according to an embodiment of the present invention.

FIG. 5 takes this example further, and shows application of combining two pattern units to form a repeating unit for the sub-sampling pattern. In this example, the first 4*4-pixel pattern unit 510 is shown on the top left corner of the sub-sampling pattern 500. The second 4*4-pixel pattern unit 520 in this example, is a reflection of the first pattern unit 510 on a vertical axis (or horizontal axis). The sub-sampling pattern 500 is constructed by repeating the first and second pattern units. Using the full sub-sampling pattern 500, a uniform distribution of sample points is extracted from a macroblock pair when performing frame ME. When conducting field ME, the sub-sampling pattern 530 for an upper field and the sub-sampling pattern 540 for a lower field also extract uniform distribution of sample points from the macroblock pair. When compared to the prior art field ME distribution in FIG. 3, there are no un-sampled areas in the form of alternating vertical lines. Therefore, the resulting sub-sampling pattern 500 provides a more uniform sample distribution that can be applied to both frame ME and field ME.

Please note that although the above examples make use of a pattern unit of the four-queen sub-sampling pattern, and variations of the pattern unit of the four-queen sub-sampling pattern, alternate embodiments of the present invention can use a pattern unit of a number of different sub-sampling patterns. These may include a full sampling pattern, a quarter pattern, or an 8-queen pattern. The sub-sampling pattern used to sample the current macroblock pair and candidate macroblock pair comprises of at least two different pattern units, and can be configured in multiple variations to suit a particular compression or sampling requirement according to different embodiments. In some other embodiments, the repeating unit of a sub-sampling pattern combines different pattern units side by side, for example, forming a 8*4-pixel repeating unit by arranging a second pattern unit at the right hand side of the first pattern unit. Also, the sub-sampling pattern design of the present invention is applicable for both interlaced video source and progressive video source. The sub-sampling pattern for a progressive video source can be 16*16-pixel as the block matching unit for progressive video is macroblock instead of macroblock pair.

As previously stated, the sub-sampling pattern is used to select certain pixels of a current MB pair and candidate MB pairs for error measure calculation. The error measures for the candidate MB pairs in the search range of the reference frame are then compared to determine a motion vector indicating the position of the matching MB pair corresponding to the minimum error measure among the error measures. The error measure used can vary according to the specific embodiment of the invention, and can include a Sum of Absolute Differences (SAD).

Figure 6:
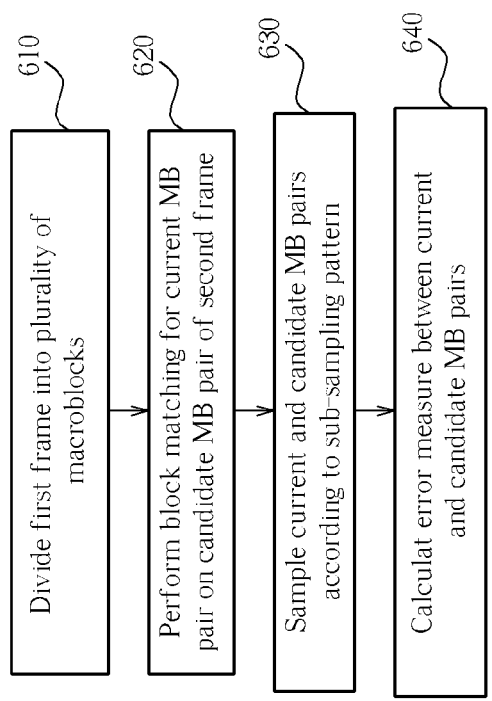
FIG. 6 is a process flow chart illustrating an embodiment of the present invention motion estimation method.

An embodiment of a motion estimation method for video compression is illustrated through the flow chart of FIG. 6. Provided that substantially the same result is achieved, the steps of motion estimation process need not be in the exact order shown and need not be contiguous, that is, other steps can be intermediate. The method comprises:

Step 610: Dividing a first frame into a plurality of macroblocks.

Step 620: Performing block matching for a current macroblock (MB) pair on a candidate MB pair of a second frame.

Step 630: Sampling the current and candidate MB pairs according to a sub-sampling pattern, where the sub-sampling pattern is constructed by a plurality of repeating units, and each repeating unit is composed of a first and a second pattern unit.

Step 640: Calculating an error measure between the current and candidate MB pairs.

In further embodiments of the above motion estimation method shown in FIG. 6, a third pattern unit can also be utilized to form the sub-sampling pattern. This provides further variability in providing a specific sampling distribution according to sampling requirements.

By providing a sub-sampling pattern based on different pattern units, a uniform overall sample distribution can be obtained for both frame ME and field ME processing on interlaced video. In some preferred embodiments, a sub-sampling pattern can be easily created by deriving a second pattern unit from a first pattern unit, and the first pattern unit can be a pattern unit of a conventional pattern (e.g. four-queen pattern) frequently used in matching-pixel sub-sampling. This will allow for a more efficient and effective motion estimation procedure with sub-sampling in video compression.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A matching-pixel sub-sampling motion estimation method for video compression utilized in a video coding apparatus, the method comprising:

utilizing the video coding apparatus to perform the following steps:

dividing a first frame into a plurality of macroblocks; and performing block matching for a current macroblock pair on a candidate macroblock pair of a second frame by:

sub-sampling the current macroblock pair and the candidate macroblock pair according to a sub-sampling pattern; and calculating an error measure between the current and candidate macroblock pairs;

wherein the sub-sampling pattern is constructed by a plurality of repeating units, and each repeating unit is composed of a first and a second pattern unit, where a pattern of the first pattern unit is different from a pattern of the second pattern unit;

wherein the size of a pattern unit is 4*4 pixels, the size of a repeating unit is 4*8 pixels, the first pattern unit is a repeating unit of a four-queen pattern, and the second pattern unit is derived from the first pattern unit.

2. The method of claim 1, wherein the second pattern unit is the first pattern unit being rotated by a predetermined angle.

3. The method of claim 1, wherein the second pattern unit is the first pattern unit mirrored on a horizontal axis or vertical axis.

4. The method of claim 1, wherein the second pattern unit is the first pattern unit being left or right shifted by a predetermined column.

5. The method of claim 1, wherein the second pattern unit is the first pattern unit being up or down shifted by a predetermined row.

6. The method of claim 1, further comprising:

repeating the block matching step for the current macroblock pair on a plurality of candidate macroblock pairs of the second frame to calculate a plurality of error measures; and determining a motion vector according to a minimum error measure of the plurality of error measures.

7. The method of claim 1, wherein the error measure is a Sum of Absolute Differences (SAD).

8. The method of claim 1, wherein the first pattern unit and the second pattern unit of the repeating unit are adjacent to each other horizontally or vertically.

* * * * *